United States Patent [19]

Nikolic

[11] 4,404,938
[45] Sep. 20, 1983

[54] FOUR-STROKE-CYCLE INTERNAL COMBUSTION ENGINE WITH FUEL INJECTION

[76] Inventor: Zivomir Nikolic, Ul.Vl. Nazora 24, 51262 Kraljevica, Yugoslavia

[21] Appl. No.: 322,234

[22] Filed: Nov. 17, 1981

[51] Int. Cl.³ .......................... F02B 3/00; F02B 23/00
[52] U.S. Cl. .................................... 123/256; 123/261; 123/275; 123/282; 123/293
[58] Field of Search ................ 123/256, 293, 291, 286

[56] References Cited

U.S. PATENT DOCUMENTS 2,914,042  11/1959  Riesler ................................. 123/256
4,125,094  11/1978  Noguchi .............................. 123/256

Primary Examiner—Ronald B. Cox
Attorney, Agent, or Firm—Fleit, Jacobson, Cohn & Price

[57] ABSTRACT

In a four stroke cycle internal combustion engine, a combustion chamber is disposed above the cylinder head and is connected by a passage to the piston chamber. The piston at its top dead center almost contacts the cylinder head. Inlet and outlet valves and spark plug means are associated with the top portion of the combustion chamber. The injecting device protrudes into the combustion chamber and is upwardly directed. The combustion chamber is surrounded by another chamber, which communicates with the combustion chamber through slots, which open into the top portion of the combustion chamber. The lower portion of the surrounding chamber communicates through openings with the combustion chamber. The openings are smaller in cross-section than the slots so that the explosive gases flow from the combustion chamber into the surrounding chamber and flow back through the openings into the surrounding chamber. This results in turbulence and mixing as in a cyclone so that a good combustion is ensured. Downwardly flaring conical openings are additional provided, which open into the surrounding chamber at its bottom and extend through the cylinder head toward the piston so that the surrounding chamber will be effectively scavenged during the exhaust stroke.

2 Claims, 5 Drawing Figures

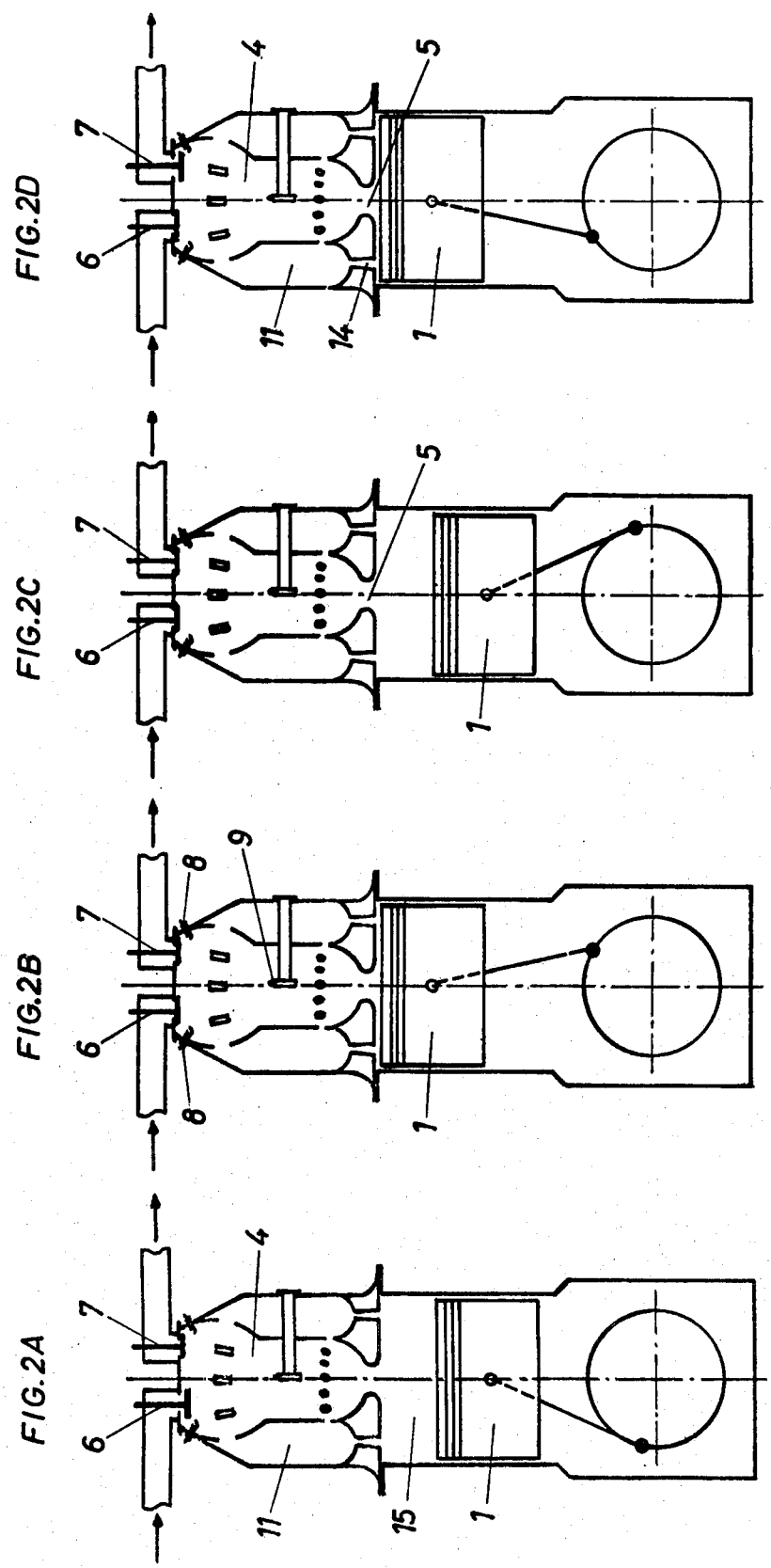

FOUR-STROKE-CYCLE INTERNAL COMBUSTION ENGINE WITH FUEL INJECTION

BACKGROUND OF THE INVENTION

A problem arising in the operation of conventional gasoline engines resides in incomplete combustion, which may produce toxic combustion residues, which enter the ambient air and pollute the regions near streets and roads. The most highly toxic compounds which are emitted are carbon monoxide (CO), hydrocarbons ($C_mH_n$), nitrogen oxides ($N_xO_y$) and lead compounds ($Pb(C_2H_5)_4$ and $PB(CH_3)_4$), which are added to the gasoline as antiknock agents. The average quantities in which the above-mentioned components are emitted in case of an incomplete combustion of 100 liters of gasoline amount to about 10 to 30 kg CO, 2 to 4.8 kg $C_mH_n$ and 0.2 to 1.5 kg $N_xO_y$. Only $CO_2$, $H_2O$ and N are emitted when pure gasoline (without antiknock agents) is completely burnt. At the present time, regulations in effect in the United States (California Test, abbreviated as CT, and Federal Test Procedure, abbreviated as FTP) require a stagewise decrease of the noxious components of the exhaust gas or of the additives to gasoline. For this reason great efforts are being made by the automobile industry to fulfil these requirements. In carburetor motors, these efforts are made in the direction of improved carburetors. Inherently better results are produced with engines operating with direct fuel injection but still do not meet the requirements of CT and FTP. A so-called "catalytic converter" has also been added in order to improve the oxidation. The present effective efficiency of internal combustion motors amounts to between 23 and 28% and must be regarded as rather low.

For this reason it is an object of the invention to provide a novel four-stroke-cycle internal combustion engine which is friendly to the environment and delivers no deleterious exhaust gases in any speed range.

The novel four-stroke-cycle internal combustion engine is to be useful for various fuels, such as kerosine, alcohol, benzene and particularly for unleaded gasoline.

Besides, the novel four-stroke-cycle internal combustion engine should have a higher efficiency than conventional engines of that kind.

SUMMARY OF THE INVENTION

In accordance with the invention the disadvantages of the four-stroke-cycle internal combustion engines of the known kind are eliminated in that a more complete combustion is effected in a combustion chamber which is separate from the cylinder of the engine. As a result, the efficiency of the engine is increased and a pollution of the ambient air by noxious exhaust gases is avoided. The combustion chamber is specially designed to effect a mixing of the air with the fuel as in a cyclone, a combustion of the fuel-air mixture, and an improved scavenging as the exhaust gas is exhausted. The combustion chamber is surrounded by another chamber, which communicates with the combustion chamber through slots at the top and through openings at the bottom. The slots are larger in cross-section than the openings so that the explosive gases flow from the combustion chamber into the surrounding chamber through the slots and return through the openings into the combustion chamber. This results in turbulence and mixing as in a cyclone so that the combustion is improved. Openings provided at the bottom of the surrounding chamber and communicating with the piston chamber permit an effective scavenging during the exhausting of the combustion gases. The piston at its top dead center almost contacts the cylinder head. The inlet and outlet valves and the spark plug means are disposed near the top of the combustion chamber. The injecting device is approximately centrally disposed and upwardly directed.

BRIEF DESCRIPTION OF THE DRAWINGS

FIG. 1 is a transverse sectional view showing the engine according to the invention and FIGS. 2A, 2B, 2C and 2D are diagrammatic views illustrating the four strokes of the engine according to the invention.

DESCRIPTION OF THE PREFERRED EMBODIMENT

Figure 1:
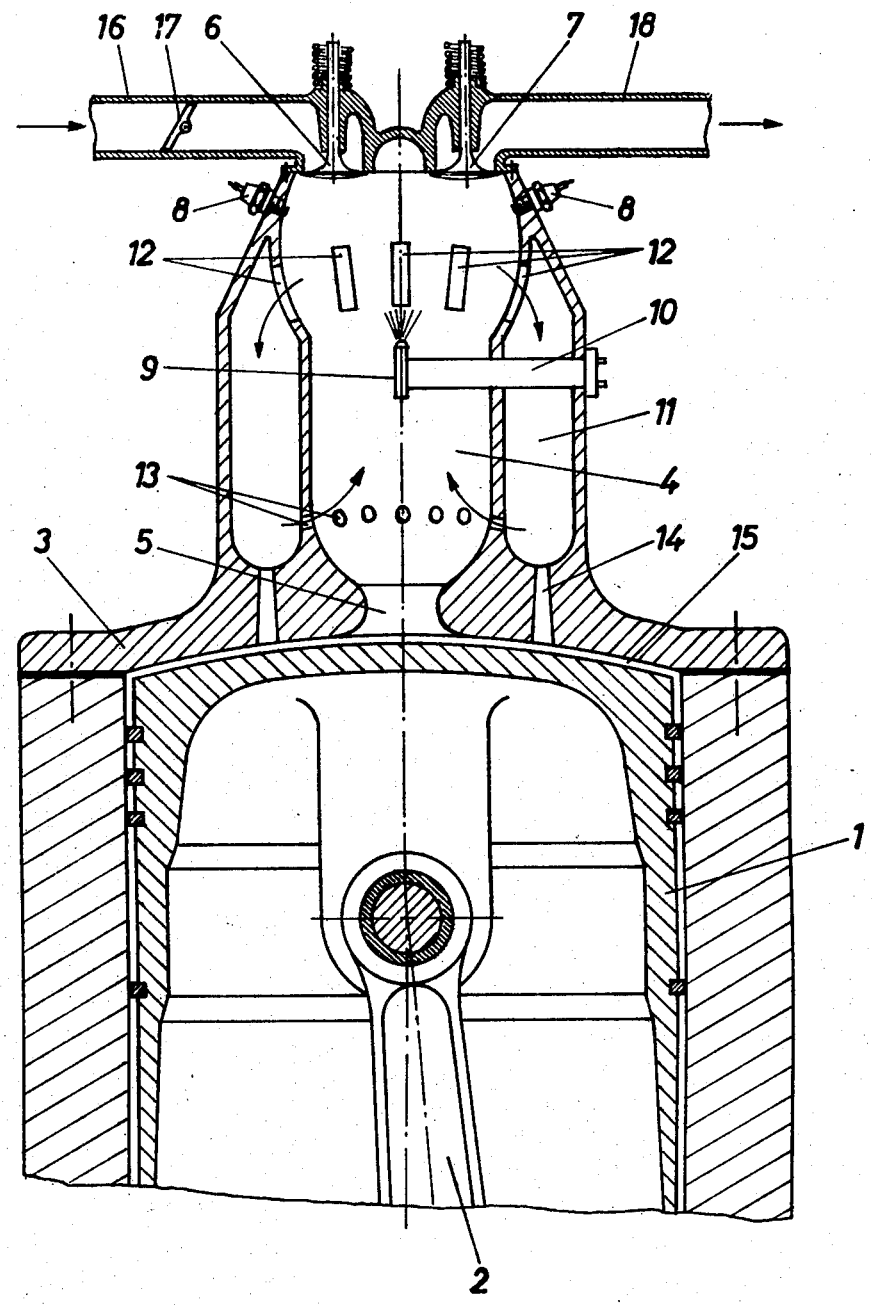

FIG. 1 is a transverse sectional view showing an illustrative embodiment of the engine according to the invention. The piston 1 and connecting rod 2 are shown at their top dead center. It is apparent from FIG. 1 that in that position the top of the piston 1 almost contacts the cylinder head 3. The cylinder head 3 is adjoined by a substantially cylindrical combustion chamber 4, which communciates through a passage 5 with the piston chamber. Inlet valves 6 and outlet valves 7 are provided at the top portion of the combustion chamber 4 and are actuated in conventional manner by cams (not shown) or the like. In the present example, two spark plugs 8 are provided below the valves 6 and 7 and are also actuated by conventional electromechanical or electrical devices as in usual four-stroke-cycle internal combustion engines. The injection nozzle 9 is approximately centrally disposed in the combustion chamber 4 and is carried by a tube 10, through which the fuel is supplied from a fuel injection pump (not shown). The combustion chamber 3 is surrounded by a chamber 11 and communicates with the latter through slots 12 at the upper portion of the combustion chamber 4 and through first openings 13 at the lower portion of the combustion chamber 4. Downwardly flaring, conical second openings 14 lead from the bottom of the chamber 11 into the piston chamber 15. From a compressor or an exhaust gas-driven turbocharger (not shown), for instance, an air supply duct 16 leads to the inlet valve 6. The duct 16 may also be connected to an air supply pipe because the engine can be operated without air-compressing means, if desired, although its power will be somewhat smaller in that case. The air supply duct 16 contains a throttle valve 17, which permits a control of the speed of the engine in conventional manner. A duct 18 leads from the outlet valve 7 to the exhaust silencer (not shown).

With reference to FIGS. 2A to 2D, the operation of an engine according to the invention will now be described; that operation is similar to that of a conventional four-stroke-cycle engine.

FIG. 2A shows the intake stroke. The inlet valve 6 is open, the outlet valve 7 is closed and the piston 1 descends so that the piston chamber 15, the combustion cham-ber 4 and the chamber 11 are filled with air.

FIG. 2B shows the piston 1 at its top dead center. Valves 6 and 7 are closed. Shortly before the top dead center, fuel is injected through the injection nozzle 9 and the ignition is initiated by the spark plugs 8.

FIG. 2C shows the expansion stroke. The combustion gases flowing through the passage 5 force the piston 1 downwardly.

Finally, FIG. 2D shows the exhaust stroke, during which the exhaust valve 7 is open and the piston rises to expel the exhaust gases through the duct 5 and the openings 14. During this stroke the chamber 11 is effectively scavenged by gas flowing through the openings 14.

What is claimed is:

1. A four-stroke-cycle internal combustion engine comprising a piston housing, a cylinder head, a crankshaft, a piston which is connected to the crankshaft by a connecting rod and has a top face which almost contacts the cylinder head when the piston is at its top dead center, a combustion chamber disposed on top of said cylinder head, a passage extending from adjacent to the piston through the cylinder head and opening into said combustion chamber, inlet and outlet valves opening into the top portion of said combustion chamber, fuel-injecting means, which are upwardly directed and protrude into said combustion chamber, at least one spark plug means protruding into said combustion chamber, a plurality of slots opening into the upper portion of said combustion chamber and permitting explosive gases to flow into a chamber which surrounds the combustion chamber, a plurality of first openings which open into said surrounding chamber at its lower portion and are smaller in cross-section than the plurality of said slots and permit said explosive gases to flow back into said combustion chamber, and a plurality of downwardly flaring, conical second openings which open into said surrounding chamber in its lower portion and extend through said cylinder head toward said piston.

2. The four-stroke-cycle internal combustion engine of claim 1, wherein air-compressing means consisting of a compressor or an exhaust gas-driven turbocharger are provided in an air supply line leading to the inlet valve.

* * * * *